United States Patent
Aslot et al.

(10) Patent No.: US 8,869,117 B2
(45) Date of Patent: *Oct. 21, 2014

(54) CAPTURING MULTI-COMPONENT TRACE FOR UNIT OF WORK

(71) Applicant: International Business Machines Corporation, Armonk, NY (US)

(72) Inventors: Vishal Chittranjan Aslot, Austin, TX (US); Brian W. Hart, Austin, TX (US); Anil Kalavakolanu, Austin, TX (US); Evelyn Tingmay Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,452

(22) Filed: Nov. 19, 2013

(65) Prior Publication Data

US 2014/0181795 A1 Jun. 26, 2014

Related U.S. Application Data

(63) Continuation of application No. 13/217,413, filed on Aug. 25, 2011, now Pat. No. 8,589,891.

(51) Int. Cl.
*G06F 9/44* (2006.01)
(52) U.S. Cl.
USPC .......................................................... 717/128
(58) Field of Classification Search
USPC .......................................................... 717/128
See application file for complete search history.

(56) References Cited

U.S. PATENT DOCUMENTS

| | | | |
|---|---|---|---|
| 5,929,873 A | 7/1999 | Qureshi | |
| 5,978,902 A | 11/1999 | Mann | |
| 6,633,838 B1 | 10/2003 | Arimilli et al. | |
| 7,131,113 B2 | 10/2006 | Chang et al. | |
| 7,747,986 B2 | 6/2010 | LaVigne et al. | |
| 7,810,075 B2 | 10/2010 | Dostert et al. | |
| 7,904,757 B2 | 3/2011 | Niikkonen et al. | |
| 8,028,200 B2 * | 9/2011 | Ivanov et al. | 714/45 |
| 2002/0129309 A1 | 9/2002 | Floyd et al. | |
| 2007/0150870 A1 * | 6/2007 | Fitch et al. | 717/128 |
| 2007/0220360 A1 * | 9/2007 | Weinert et al. | 714/45 |
| 2008/0052681 A1 * | 2/2008 | Yang | 717/128 |
| 2013/0055215 A1 * | 2/2013 | Aslot et al. | 717/128 |

OTHER PUBLICATIONS

Cisco Systems, Inc., "Configuring the Event Tracer," 2007.

* cited by examiner

*Primary Examiner* — Philip Wang
(74) *Attorney, Agent, or Firm* — John D. Flynn; Gregory K. Goshorn; Greg Goshorn, P.C.

(57) ABSTRACT

Provided are techniques for the tracing of computer processes and, more specifically, to techniques that enable a work unit to be traced across multiple processing components. A data structure is created and associated with a work unit. The first time a unit of work is processed a tracing context is retrieved form a pool and associated with the data structure. As the unit of work is passed from component to component, the data structure is passed so that each component has access and is able to augment the same tracing context associated with the unit of work.

20 Claims, 7 Drawing Sheets

CAPTURING MULTI-COMPONENT TRACE FOR UNIT OF WORK

CROSS-REFERENCES TO RELATED APPLICATIONS

The present application is a continuation and claims the benefit of the filing date of an application entitled, "Capturing Multi-Component Trace for Unit of Work" Ser. No. 13/217,413, filed Aug. 25, 2011, now U.S. Pat. No. 8,589,891, issued Nov. 19, 2013, assigned to the assignee of the present application, and herein incorporated by reference.

BACKGROUND OF THE INVENTION

The claimed subject matter relates generally to tracing of computer processes and, more specifically, to techniques that enable a work unit to be traced across multiple processing components.

Currently, computing systems provide various processing trace features. Trace data typically includes information concerning the overall activity in a system or the activity for selected components and processes. One typical trace methodology, i.e. a full system trace, monitors every processing component with respect to each work unit and the resultant data is stored. A second trace methodology, i.e. a component-specific trace, monitors a particular component and stores trace data for each unit of work that utilizes the component.

SUMMARY

Provided are techniques for tracing a particular work unit across multiple processing components. The techniques include selecting a unit of work (UOW) corresponding to an application program, wherein the UOW is to be processed by a plurality of computing components; selecting a trace context from a pool of trace components; attaching the UOW to the trace context; storing, in the trace context, first data corresponding to processing, of the UOW by a first component of the plurality of components; passing the trace context from the first component to a second component of the plurality of components; storing, in the trace context, second data corresponding to processing of the UOW by the second component; writing the trace context to a trace buffer containing a history of the UOW; detaching the UOW from the trace context; and returning the trace context to the pool of trace components once the first and second data have been stored in the trace context.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection, having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
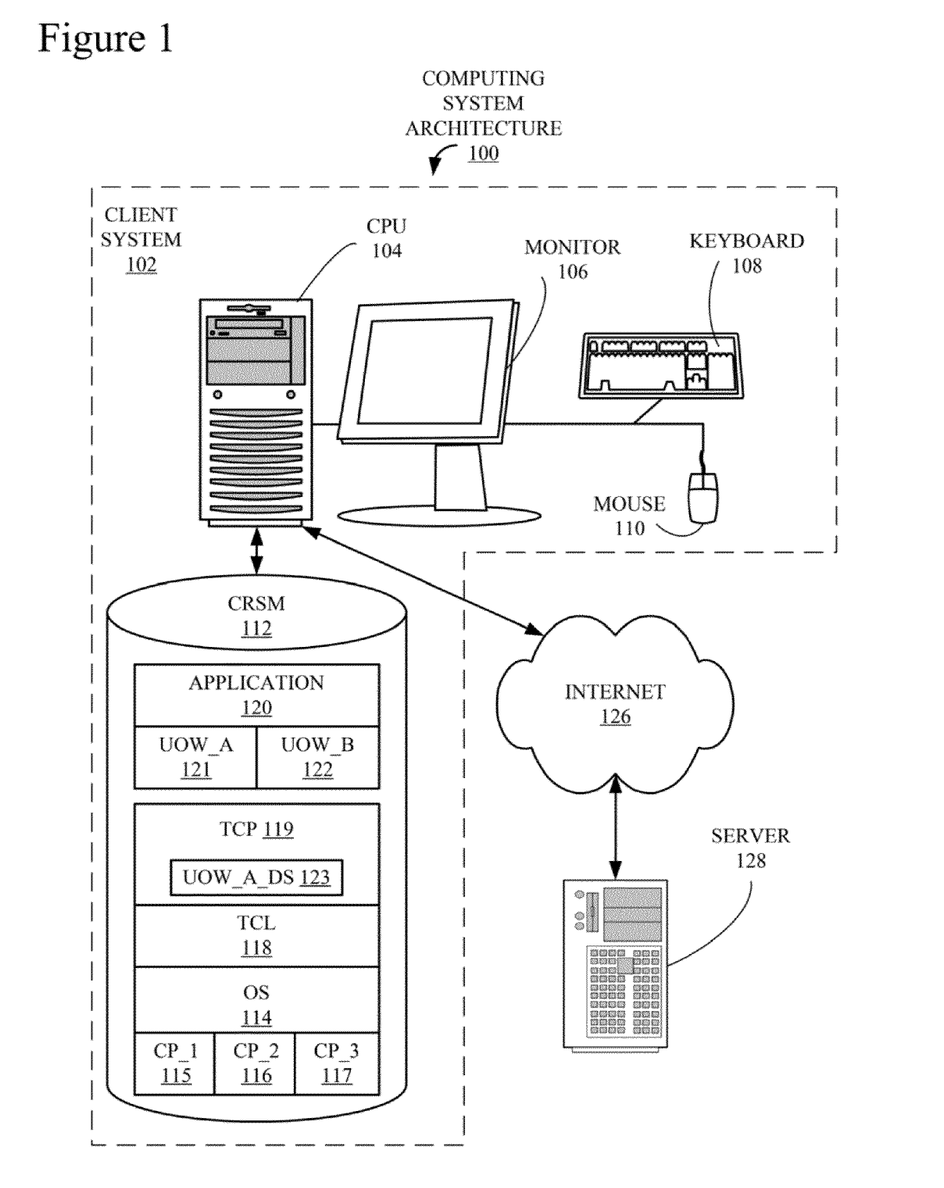
FIG. 1 is a block diagram of a computing system architecture that may implement the claimed subject matter.

Turning now to the figures. FIG. 1 is a block diagram of one example of a computing system architecture 100 that incorporates the claimed subject matter. A client system 102 includes a central processing unit (CPU) 104, coupled to a monitor 106, a keyboard 108 and a pointing device, or "mouse," 110, which together facilitate human interaction with computing system 100 and client system 102. Also included in client system 102 and attached to CPU 104 is a computer-readable storage medium (CRSM) 112, which may either be incorporated into client system 102 i.e. an internal device, or attached externally to CPU 104 by means of various, commonly available connection devices such as but not limited to, a universal serial bus (USB) port (not shown). It should be understood that CPU 104 includes one or more processors (not shown) as well as other elements such as, but not limited to memory, buses and a power supply, that will be familiar to one with skill in the relevant arts. CRSM 112 is illustrated as storing an operating system (OS) 114 that, in this example, incorporates the claimed subject matter. OS 114 is illustrated with three (3) components, a component_1 (CP_1) 115, a component_2 (CP_2) 116 and a component_3 (CP_3) 117. Each of components 115-117 perform a specific task with respect to OS 114. An OS such as OS 114 would typically include many more components but for the sake of simplicity only three (3) are shown. OS 114 also includes trace component logic (TCL) 118 and as trace component pool (TCP) 119. TCL 118 stores executable code for implementing the tracing features provided by OS 114. TCP 119 includes storage for trace contexts employed by TCL 118. TCP 119 also is illustrated storing a data structure, or a UOW_A DS 123, for associating a particular trace context with a specific unit of work. UOW_A DS 123 is used as an example throughout the Specification and is explained in more detail below in conjunction with FIGS. 3-7.

CRSM 112 is also illustrated storing a computer software application, or application, 120 that employs the claimed subject matter to provide trace contexts for units of work associated with application 120, i.e. a Unit_of_work_A (UOW_A) 121 and a Unit_of_Work_B (UOW_B) 122. Elements 115-122 are described in more detail below in conjunction with FIGS. 2-6 to illustrate the claimed subject matter.

Client system 102 and CPU 104 are connected to the Internet 126, which is connected to a server computer 128. Although in this example, client system 102 and server 128 are communicatively coupled via the Internet 126, they could also be coupled through any number of communication mediums such as, but not limited to, a local area network (LAN) (not shown). Further, it should be noted there are many possible computing system configurations, of which computing system architecture 100 is only one simple example.

Figure 2:
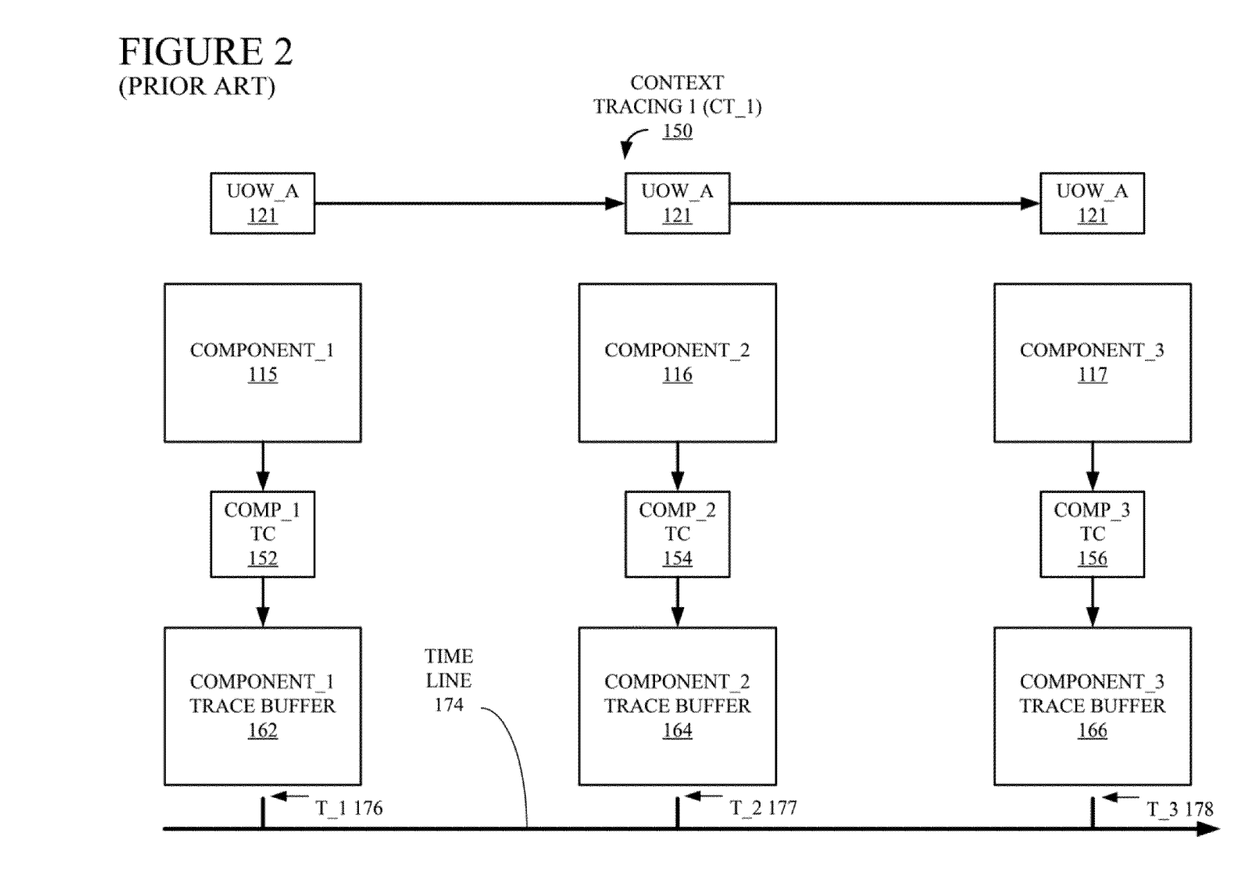
FIG. 2 is a block diagram of current trace methodology, specifically a lull system trace.

FIG. 2 is to block diagram of a current content tracing methodology (CT_1) 150, specifically a full system trace, with respect to one particular work unit, i.e. UOW_A 121 (FIG. 1). A time line 174 indicates that UOW_A 121 being processed sequentially by component_1 115 (FIG. 1), component_2 116 (FIG. 1) and component_3 117 (FIG. 1) at times T_1 176, T_2 177 and T_3 178, respectively. It should be noted that concurrent processing is also a possibility. It should also be understood that three time intervals and components are shown for the sake of simplicity and that less or more components and time intervals may be involved.

Once, at time T_1 176, component_1 115 has processed UOW_A 121, a component_1 trace context (Comp_1 TC) 152 is generated. Comp_1 TC 152 is then incorporated into a component_1 trace buffer 162. Typically component_1 trace buffer 162 also stores trace contexts corresponding to other units of work handled by component_1 115. At time T_2 177, UOW_A 121 is processed by component_2 116, generating a component_2 trace context (Comp_2 TC) 154, which is stored in a component_2 trace buffer 164. At time T_3 178, UOW_A 121 is processed by component_3 117, generating a component_3 trace context (Comp_3 TC) 156, which is stored in a component_2 trace buffer 166. As should be apparent to one with skill in the relevant arts, this particular methodology stores trace information relating to UOW_A 121 in three different trace buffers 162, 164 and 166.

Figure 3:
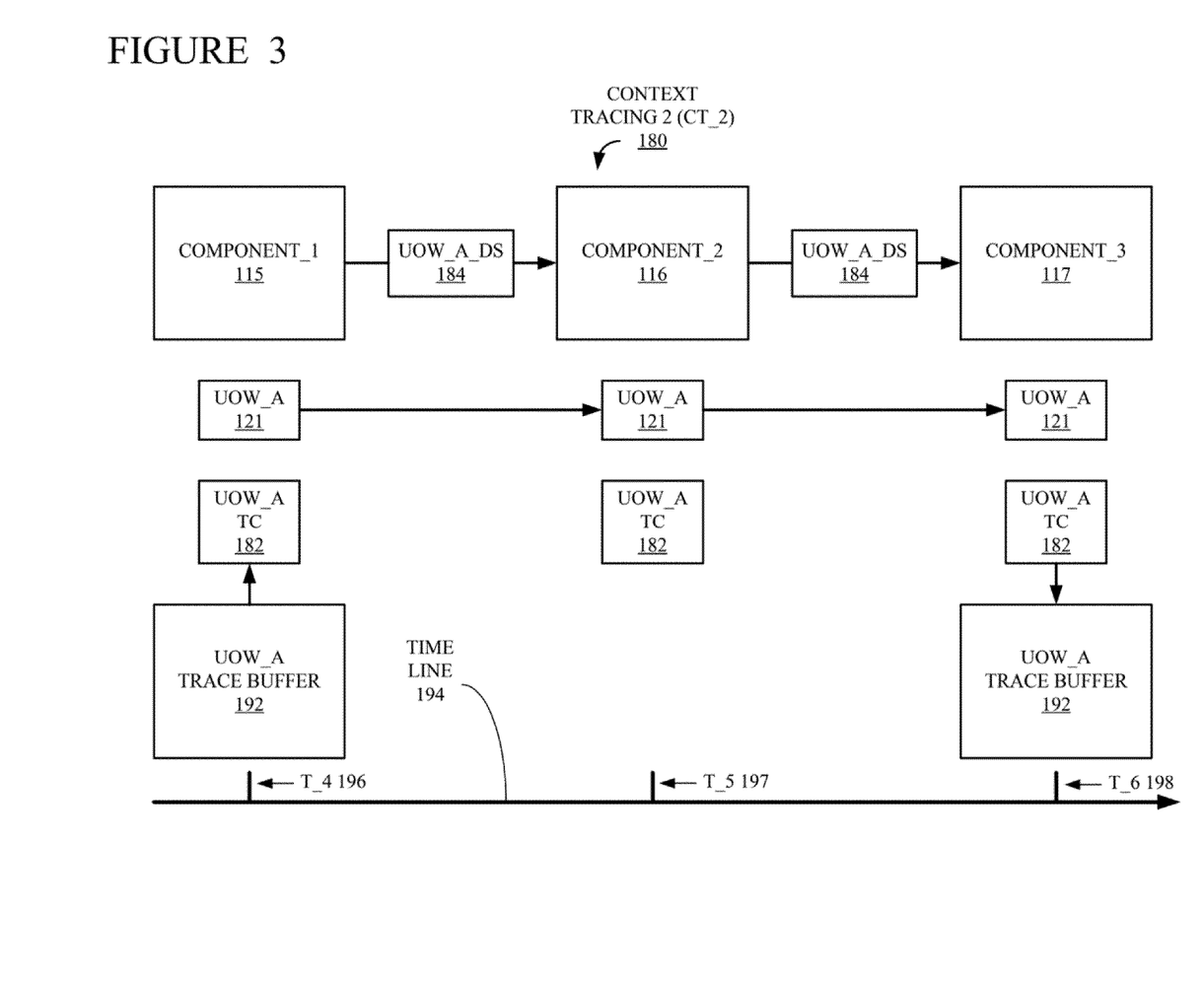
FIG. 3 is a block diagram of a trace methodology in accordance with the claimed subject matter.

FIG. 3 is a block diagram of a context tracing (CT 2) 180 in accordance with the claimed subject matter. Like CT_1 150 (FIG. 2) CT_2 180 illustrates UOW_A 121 (FIGS. 1 and 2) being processed sequentially by component_1 115 (FIGS. 1 and 2), component_2 116 (FIGS. 1 and 2) and component_3 117 (FIGS. 1 and 2) at a time 196, T_5 197 and T_6 198, respectively, of a time line 194. In the following example. UOW_A 121 is processed sequentially by components 115-117, with component₁ 115 being the first to process UOW_A 121 and component_3 117 being the last. It should be understood that a UOW may be processed by more or less than three (3) components but for the sake of simplicity only components 115-117 are illustrated.

At time T_4 196, once component_1 115, which is the first component in the sequential processing, has processed UOW_A 121, a trace context that includes information on the processing, i.e. UOW_A TC 182, is retrieved from a trace buffer, i.e. UOW_A trace buffer 192. Once component_1 115 has completed processing of UOW_A 121 and generated UOW_A TC 182, UOW_A 121 is passed to component_2 116 for processing. In addition, a UOW_A data structure (DS) 184 is passed from component_1 115 to component_2 116, in this example, by a service associated with OS 114 (FIG. 1). As explained in more detail below in conjunction with FIGS. 4-7, UOW_A, DS 184 is generated by the first component that processes UOW_A 121 (see 250, FIG. 5) and is employed to provide the component 115, 116 or 117 currently executing UOW_A 121 a data pointer to UOW_A TC 182.

At time T_5 197, once component_2 116 has processed UOW_A 121, UOW_A TC 182 is augmented with information associated with the processing of UOW_A 121 by component_2 116. It should be noted that, rather than component_) 115 and component_2 116 having, separate trace contexts (see 152 and 154, FIG. 2) and separate trace buffers (see 162 and 164, FIG. 2), a single trace context, UOW_A TC 182 and a single trace buffer, UOW_A TB 192, are associated with UOW_A 121. Further, UOW_A DS 184 is passed from component to component to identify trace context 182 and trace buffer 192. In a similar fashion, at time T_6 198, once component_3 117 has processed UOW_A 121, UOW_A TC 182 is augmented with information related to the processing by component_3 117, which is the last component to process UOW_A 121. At his point. UOW_A TC 182 is returned to UOW_A trace buffer 192 (see 270, FIG. 7).

Figure 4:
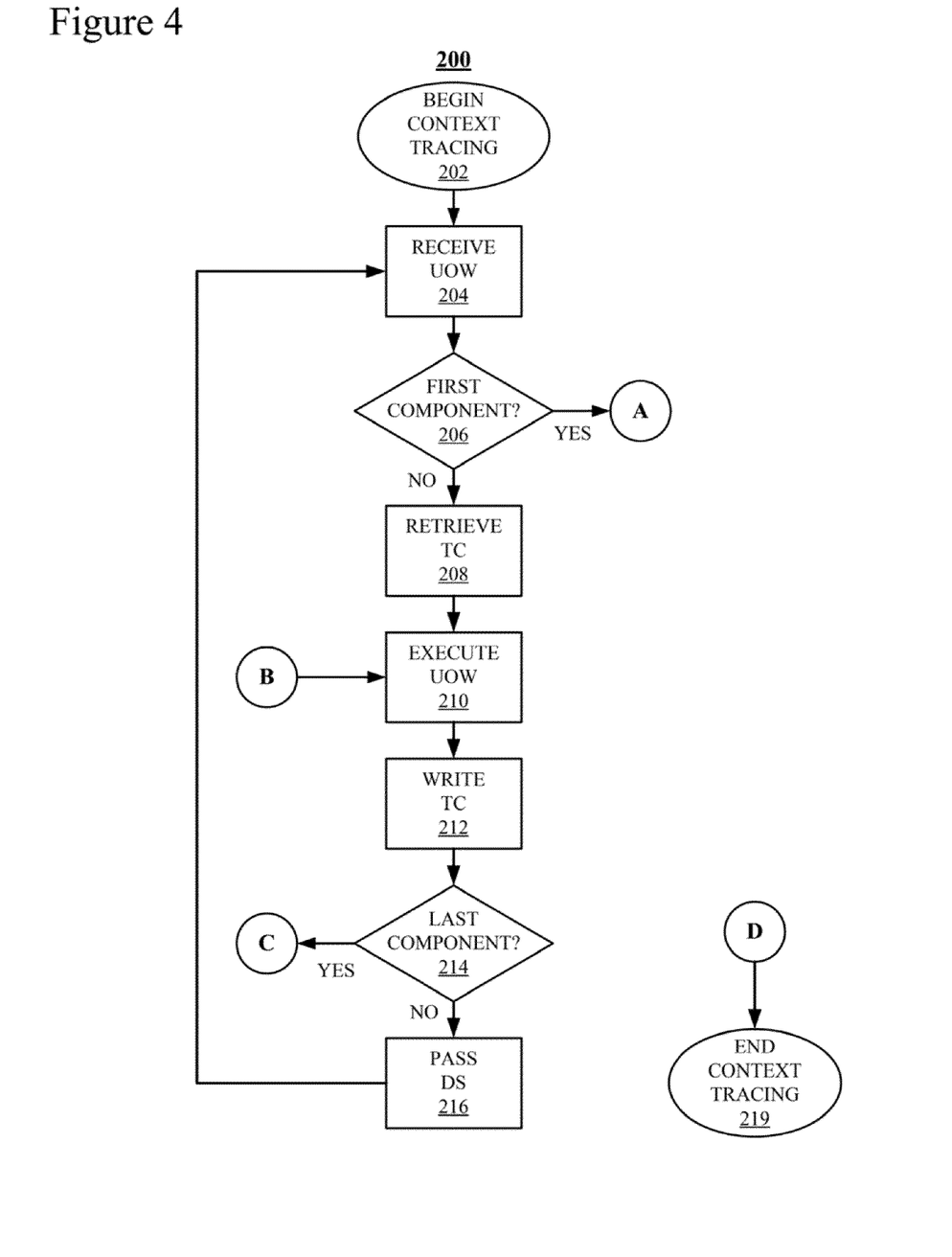
FIG. 4 is a flowchart showing one example of a Context Tracing process implemented in accordance with the claimed subject matter.

FIG. 4 is a flowchart showing one example of a Context Tracing process 200 implemented in accordance with the claimed subject matter. In this example, process 200 is associated with logic of TCL 118 (FIG. 1) stored on CRSM 112 (FIG. 1) of client system 102 (FIG. 1) and executed on one or more processors (not shown) of CPU 104 (FIG. 1).

Process 200 starts in a "Begin Context Tracing" block 202 and proceeds immediately to a "Receive Unit-of-Work (UOW)" block 204. During processing associated with block 204, a UOW, which in the following example is UOW_A 121 (FIGS. 1-3), is received by a component such as components 115, 116 and 117 (FIGS. 1-3). As described above in conjunction with FIG. 1, a UOW is typically associated with an application such as application 120 that is initiated on a computing system such as computing system 192 (FIG. 1).

During processing associate with a "First Component?" block 206, a determination is made as to whether or not the component that received UOW_A 121 during processing associated with block 204 is the first component that has received the particular UOW for processing. If so, control proceeds via a transition point A to logic for handling this scenario (see 250, FIG. 5). If not, control proceeds to a "Retrieve. Trace Context (TC)" block 208. During processing associated with block 208, a trace context, such as UOW_A TC 182 (FIG. 3), associated with TCP 119 (FIG. 1) that was generated during processing associated with a first component (see 250, FIG. 5) is retrieved from CRSM 112. In formation that notifies the current component, which in this example is component_2 116 (FIGS. 1-3), the location of UOW_A 182 is stored in UOW_A DS 184, which has been passed by OS 114. During processing associated with an "Execute UOW" block 210, UOW_A 121 is executed by a component such as components 115-117. During processing associated with a "Write TC" block 212, information associated with the execution of UOW_A 121 is stored in UOW_A TC 182, which was retrieved during processing associated with block 208.

During processing associated with a "Last Component?" block 214, a determination is made as to whether or not the component that received UOW_A 121 during processing associated with block 204 is the last component that has received the particular UOW. If so, control proceeds via a transition point C to logic for handling this scenario (see 270, FIG. 6). If not, control proceeds to a "Pass Data Structure (DS)" block 216. During processing associated with block 216, UOW_A DS 184 is transmitted to the next component that is to process UOW_A 121 and control returns to block 204 in which the next component to process UOW_A 121 receives UOW_A 121 and UOW_A DS 184.

Figure 5:
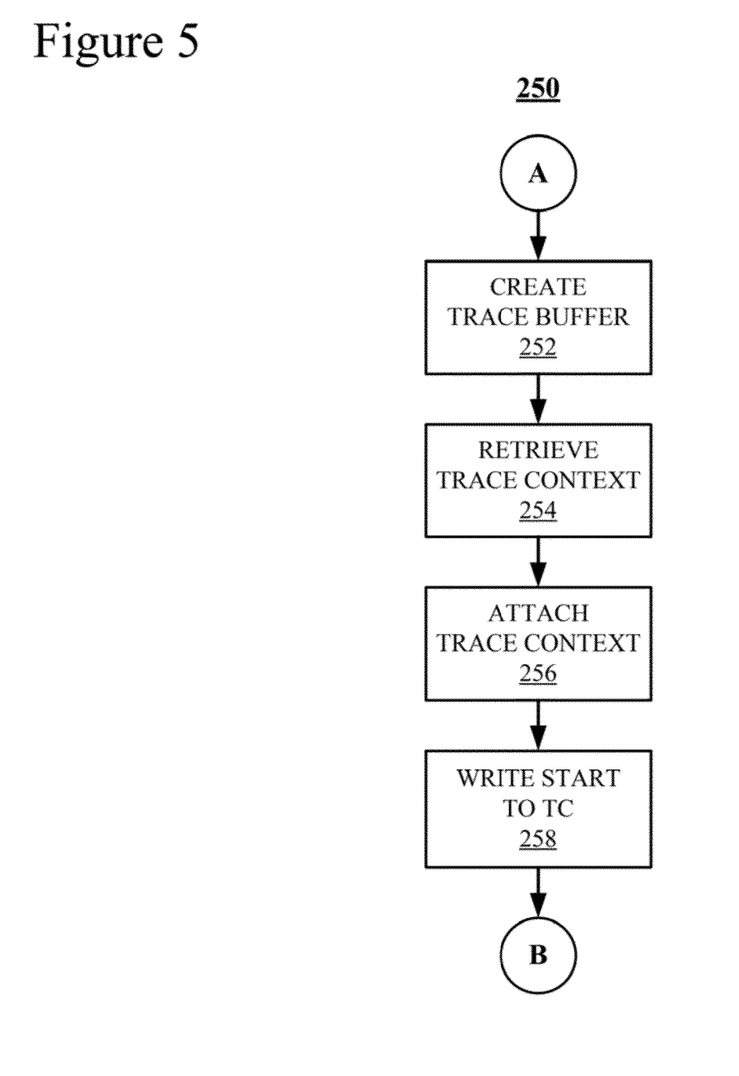
FIG. 5 is as flowchart showing one aspect, i.e. processing associated with a first component, of the Context Tracing process first introduced in FIG. 4.

Also include in FIG. 4 are a transition point B and a transition point D. Transition point B is a return from processing associated with a determination that the current component is the first block (see 206; FIG. 5). Transition block D is associated with processing a last component to execute UOW_A 121 (see FIG. 6). From transition point D control proceeds to an "End Context Tracing" block 219 in which process 200 is complete.

FIG. 5 is a flowchart showing one aspect 250, i.e. processing associated with a first component, or, in this example, component_1 115 (FIGS. 1-3), of the Context Tracing process first introduced, in FIG. 4. Like process 200 (FIG. 4), logic associated with process 250 is in TCL 118 (FIG. 1) stored on CRSM 112 (FIG. 1) of client system 102 (FIG. 1) and executed on one or more processors (not shown) of CPU 104 (FIG. 1).

Process 250 is entered via transition point A (FIG. 4) and control proceeds immediately to a "Create Trace Buffer" block 252. During processing associated with block 252. UOW_A trace buffer 192 (FIG. 3) is created in TCP 119 (FIG. 1). In addition, UOW_A DS 184 (FIG. 3) is generated. During processing associated with a "Retrieve Trace Context" block 254, UOW_A TC 182 (FIG. 3) is retrieved from UOW_A trace buffer 192. During processing associated with an "Attach Trace Context" block 256, a data pointer is written to UOW_A DS 184 that enables each component to locate UOW_A TC 182 when UOW_A DS 184 is passed to the component (see 216, FIG. 4).

Figure 7:
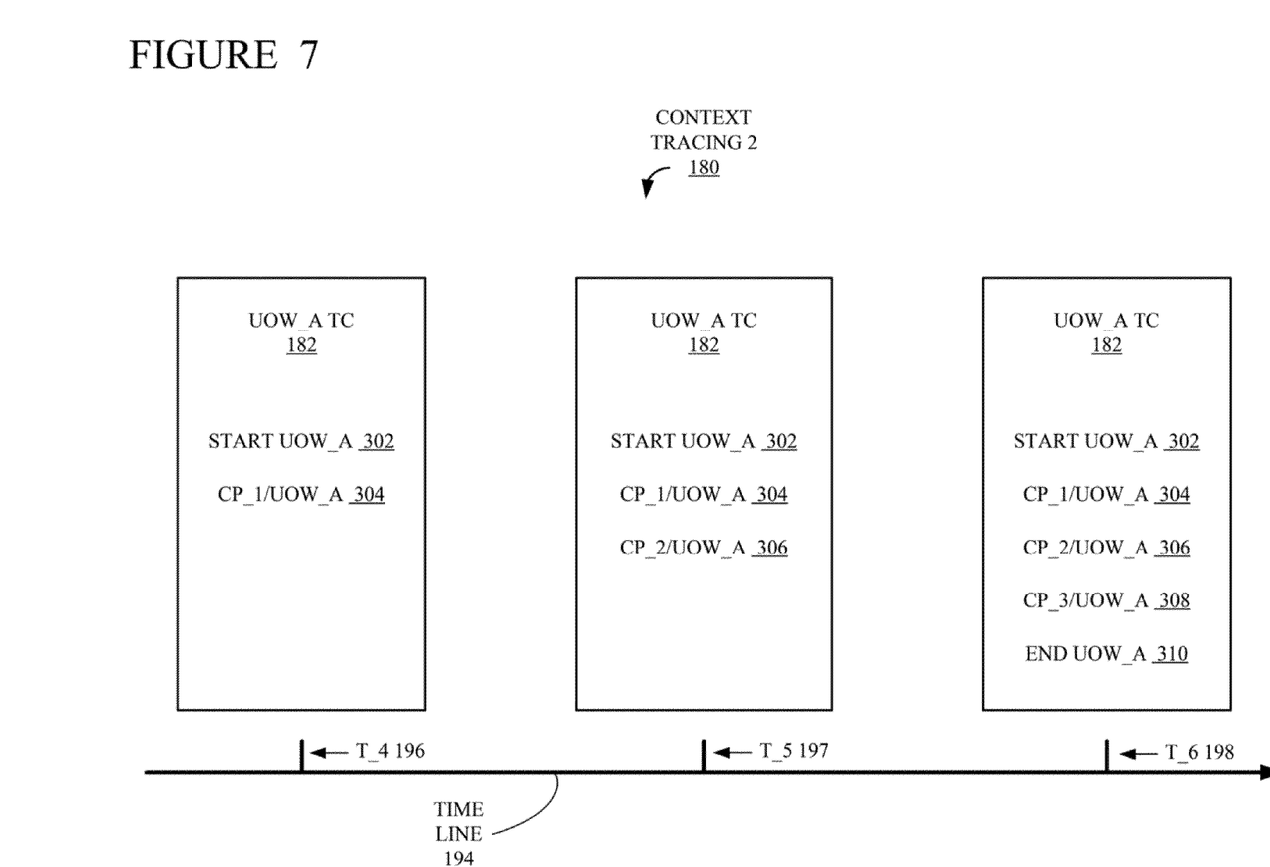
FIG. 7 is a block, diagram illustrating a Unit-of-Work_A (UOW_A) trace context, first introduced in FIG. 3, at various points during the Context Tracing process of FIG. 4-6.

During processing associated with a "Write Start to Trace Context (TC)" block 258, a first entry is written to UOW_A TC 182 to indicate that the current component is the first component to process UOW_A 121 (see 302, FIG. 7). Finally, process 250 returns to process 200 via transition point B and processing continues as described above.

Figure 6:
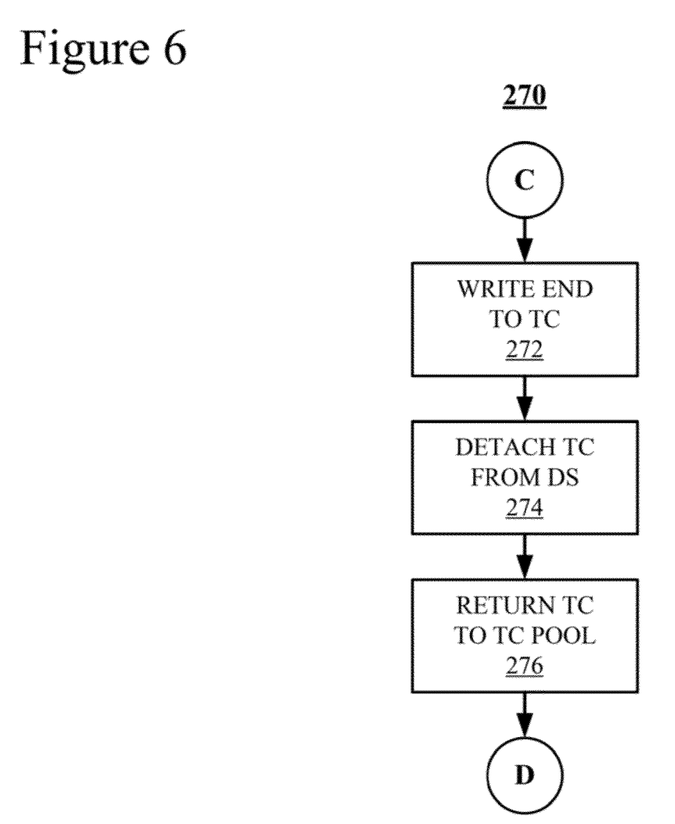
FIG. 6 is a flowchart showing a second aspect, i.e. processing, associated with a final component, of the Context Tracing process first introduced in FIG. 4.

FIG. 6 is a flowchart showing a second aspect 270, i.e. processing associated with a final component, or, in this example, component_3 115 (FIGS. 1-3), of the Context Tracing process first introduced in FIG. 4. Like process 200 (FIG. 4) and process 250 (FIG. 5), logic associated with process 270 stored in MIL 118 (FIG. 1) On stored on CRSM 112 (FIG. 1) of client system 102 (FIG. 1) and executed on one or more processors (not shown) of CPU 104 (FIG. 1).

Process 270 is entered via transition point C (FIG. 4) and control proceeds immediately to a "Write End to Trace Context (TC)" block 272. During processing associated with block 272, a last entry is written to UOW_A TC 182 to indicate that the current component is the last component to process UOW_A 121 (see 310, FIG. 7). During processing associated with a "Detach TC from DS" block 274, UOW_A TC 182 is disassociated from UOW_A DS 184. During processing associated with a "Return TC to TC Pool" 276, UOW_A TC 182 is returned to UOW_A trace buffer 192, which is stored in TCP 119 (FIG. 1).

There are several means of handling the return of the trace context to the trace pool. Examples include, but are not limited to, maintaining the trace data in the trace buffer and deleting the trace data when the trace context is reused; maintaining the trace data in the trace buffer and retaining the trace butter when the trace context is reused; donating the trace data to a parent trace component; and deleting the trace. In addition, the disposition of the trace data may be determined by the component returning the trace context to the pool; by the operator of the operating system; by the success or failure of the unit of work; or by some combination. Finally, process 270 returns to process 204) via a transition point D.

FIG. 7 is a block diagram illustrating a UOW_A TC 182, first introduced in FIG. 3, at various points during Context Tracing process 200 of FIGS. 4-6. UOW_A TC 182 is illustrated at points of time T_4 196, T_5 197 and T_6 198 of time line 194, which were introduced in FIG. 3. At T_4 196, UOW_A TC 182 has an entry indicating processing by a first component, or a Start UOW_A 302 (see 258, FIG. 5), and an entry corresponding to the processing of UOW_A 121 by component_1 115, or a CP1/UOW_A 304 (see 212, FIG. 4). At T_5 197, UOW_A TC 182, which already includes entries 302 and 304, has also has an entry corresponding to the processing of UOW_A 121 by component_2 116, or a CP2/UOW_A 306. At T_6 198, UOW_A TC 182, which already includes entries 302, 304 and 306, has also has an entry corresponding to the processing of UOW_A 121 by component_3 117, or a CP3/UOW_A 308, and an entry indicating processing by a final component, or an END UOW_A 310.

Once UOW_A 121 has been processed by components 115, 116 and 117. UOW_A TC 182 has been returned to UOW_A trace buffer 192 and UOW_A trace buffer 192 has been processed, UOW_A TC 182 may be retained in UOW_A trace buffer 192, deleted from UOW_A trace buffer 192 or donated to a parent trace context (not shown) corresponding to UOW_A 121.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those a ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    attaching a unit of work (UOW) corresponding to an application program to a trace context from a pool of trace contexts, wherein the UOW is to be processed by a plurality of computing components;
    storing, in the trace context, first data corresponding to processing of the UOW by a first component of the plurality of components;
    passing the trace context from the first component to a second component of the plurality of components;
    storing, in the trace context, second data corresponding to processing of the UOW by the second component;
    writing the trace context to a trace buffer containing a history of the UOW;
    detaching the UOW from the trace context; and
    returning the trace context to the pool of trace contexts once the first and second data have been stored in the trace context.

2. The method of claim 1, wherein the trace context is passed from the first component to the second component by an operating system service.

3. The method of claim 1, further comprising, responsive to returning the trace context, donating the trace data to a parent trace context.

4. The method of claim 1, wherein a first component of the plurality of components to process the UOW writes a START indication in the trace context.

5. The method of claim 1, wherein a last component of the plurality of components to process the UOW writes an END indication in the trace context.

6. The method of claim 1, the attaching the UOW to the trace context comprising:
    generating a data structure that associates the trace context to the UOA; and
    storing the data structure in a computer readable storage medium.

7. The method of claim 6, wherein the passing of the trace context from the first component to the second component comprises transmitting a reference to a data structure from the first component to the second component.

8. An apparatus, comprising:
    a plurality of processors;
    a non-transitory computer-readable storage medium coupled to the plurality of processors; and
    logic, stored on the computer-readable storage medium and executed on the plurality of processors, for:

attaching a unit of work (UOW) corresponding to an application program to a trace context from a pool of trace contexts, wherein the UOW is to be processed by a plurality of computing components;

storing, in the trace context, first data corresponding to processing of the UOW by a first component of the plurality of components;

passing the trace context from the first component to a second component of the plurality of components;

storing, in the trace context, second data corresponding to processing of the UOW by the second component;

writing the trace context to a trace buffer containing a history of the UOW;

detaching the UOW from the trace context; and returning the trace context to the pool of trace contexts once the first and second data have been stored in the trace context.

9. The apparatus of claim 8, wherein the trace context is passed from the first component to the second component by an operating system service.

10. The apparatus of claim 8, the logic for processing the trace data comprising donating the trace data to a parent trace context.

11. The apparatus of claim 8, wherein a first component of the plurality of components to process the UOW writes a START indication in the trace context.

12. The apparatus of claim 8, wherein a last component of the plurality of components to process the UOW writes an END indication in the trace context.

13. The apparatus of claim 8, the logic for attaching the UOW to the trace context comprising logic for:
   generating a data structure that associates the trace context to the UOA; and
   storing the data structure in a computer readable storage medium.

14. The apparatus of claim 13, wherein the logic for passing of the trace context from the first component to the second component comprises logic for transmitting a reference to a data structure from the first component to the second component.

15. A computer programming product, comprising a non-transitory computer-readable storage medium having program code embodied therewith, the program code executable by a plurality of processors to:
   attach a unit of work (UOW) corresponding to an application program to a trace context from a pool of trace contexts, wherein the UOW is to be processed by a plurality of computing components;
   store, in the trace context, first data corresponding to processing of the UOW by a first component of the plurality of components;
   pass the trace context from the first component to a second component of the plurality of components;
   store, in the trace context, second data corresponding to processing of the UOW by the second component;
   write the trace context to a trace buffer containing a history of the UOW;
   detach the UOW from the trace context; and
   return the trace context to the pool of trace contexts once the first and second data have been stored in the trace context.

16. The computer programming product of claim 15, wherein the trace context is passed from the first component to the second component by an operating system service.

17. The computer programming product of claim 15, the program code for processing the trace data is further configured to donate the trace data to a parent trace context.

18. The computer programming product of claim 15, wherein a first component of the plurality of components to process the UOW writes a START indication in the trace context.

19. The computer programming product of claim 15, wherein a last component of the plurality of components to process the UOW writes an END indication in the trace context.

20. The computer programming product of claim 15, the program code for attaching the UOW to the trace context is further configured to:
   generate a data structure that associates the trace context to the UOA; and
   store the data structure in a computer readable storage medium.

* * * * *